Oct. 31, 1939.  G. W. HARDY  2,178,073
HYDRAULIC STEERING GEAR
Filed Nov. 10, 1937
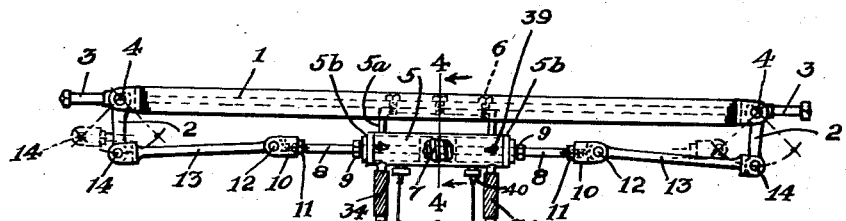
Fig. 1
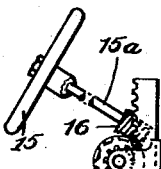
Fig. 3
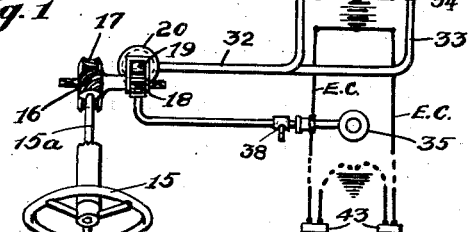
Fig. 2
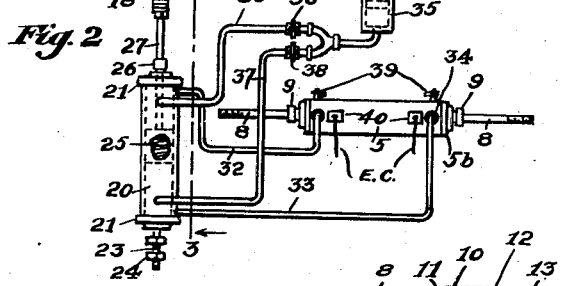
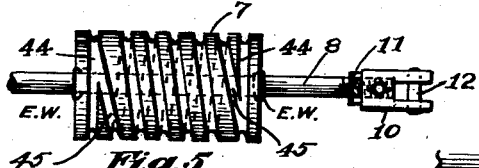
Fig. 5
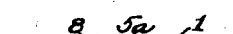
Fig. 9
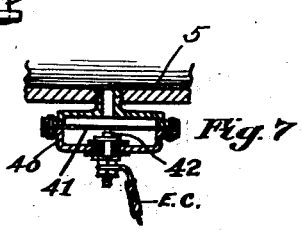
Fig. 7
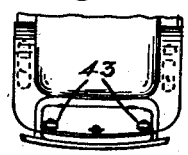
Fig. 10
Inventor,
Gordon W. Hardy.
By Henry L. Cheney.
Atty.

Patented Oct. 31, 1939

2,178,073

UNITED STATES PATENT OFFICE 2,178,073

HYDRAULIC STEERING GEAR

Gordon W. Hardy, Portland, Maine

Application November 10, 1937, Serial No. 173,913

1 Claim. (Cl. 280—87)

This invention relates to a hydraulically actuated steering-gear apparatus in the structure of which facilities are provided for automatically operating two caution lights, one on each side of the rear end of a motor vehicle.

Briefly stated the invention embodies two self-contained unit structures, a primary or master cylinder, the piston in which is actuated by the conventional type of steering wheel worm and worm gear, and a secondary cylinder which has direct connection with the steering arms of the front wheels of the vehicle, the two units being interconnected by flexible tubing carrying oil or other fluid medium under pressure only during rotary movements of the steering wheel.

This method of transmitting power from the steering wheel to the front wheels of the vehicle constitutes what might be called remote control over, and actuation of, vehicle steering, one advantage and object of which resides in the flexibility of the members interconnecting the two units, avoiding the use of positive and non-yielding structure which in conventional practice is relied upon to effect the steering of the vehicle.

The tie-rod, which is quite generally employed to interconnect the two steering arms, is, in the present invention incorporated in the secondary cylinder piston and associated parts, providing a center steering combination of the most approved type.

Various independently actuated devices have heretofore been evolved by means of which an operator of a motor car is enabled to notify the driver of a car immediately following as to his intentions with respect to turning his own vehicle either in one or the opposite direction.

In the present invention this feature, just referred to, is automatically taken care of, inasmuch as in whichever direction the wheels of the vehicle are turned, the caution lamp which responds to this particular directional movement of the wheels immediately flashes a signal, warning the traffic following as to the contemplated action of the leading vehicle.

In practically all structures holding fluids under pressure there is always present the possibility of leakage and loss of the fluid by reason of improperly made joints, and particularly is this the case with piston rods which, due to either unsuitable packing or to the loosening of the packing glands, permits the fluid in the cylinder to escape.

In the present invention it is absolutely essential that the cylinders and the interconnecting tubes and pipes be full of the liquid at all times, else slackness in the steering system develops. It is equally as important that some means be provided to cure this evil conveniently and quickly, and for this purpose I provide an oil reserve member in the form of a pump, making proper connections with the oil system so that all that is required is to open one or two valves and actuate the pump, the surplus oil or liquid being directed to either one or both sides of the master cylinder piston.

For a clearer understanding of the import of my invention reference should be had to the description found in the following specification, taken in connection with the accompanying drawing disclosing a preferred embodiment thereof.

In the drawing, in which like reference characters are employed to identify like parts in all the different views thereof—

Fig. 1 is a plan view of the complete steering apparatus;

Fig. 2 is an elevation thereof;

Fig. 3 is a side view, on a somewhat enlarged scale, and partly in section, of the primary or master cylinder and piston and actuating elements therefor;

Fig. 4 is a section on line 4—4, Fig. 1;

Fig. 5 is a view of one of the pistons, shown without packing;

Fig. 6 is the same as Fig. 5, but with the packing incompletely wound therearound Fig. 7 is a sectional view of one of the caution light switches;

Fig. 8 shows the master cylinder and parts immediately connected therewith disposed in a horizontal position, as an alternate method of installing them in a vehicle;

Fig. 9 is a detail showing a yoke connection of a link with a piston rod, and

Fig. 10 represents a fragmentary plan view of a vehicle, showing the position of the caution lamps at the rear end thereof.

Referring to the drawing, 1 is the front axle of a motor vehicle, 2, 2, the steering arms, 3, 3 the wheel spindles, and 4, 4 the king-pins thereof.

Secured to and disposed rearwardly of the front axle 1 is the secondary cylinder 5 of my apparatus, the two ends thereof being symmetrical.

This cylinder may be attached to the front axle in any one of various forms of structure, but as shown includes a bracket 5a preferably although not necessarily made integral with the cylinder, and fastened to the axle by means of bolts 6.

Within the double-ended cylinder 5 operates a piston 7, and through the piston extends a piston rod 8, also double-ended. The piston rod is secured to and at each end of the piston by electric welding, as shown at E. W., and each portion of the rod passes out of the cylinder through a cylinder head 5b and a packing nut 9.

Each end of the piston rod 8 has screw-threaded engagement with a yoke member 10 in which it is longitudinally adjustable, and a lock-nut 11 holds the rod in any position to which it is adjusted.

Pivotally connected to the yoke 10, at 12, is one end of a link 13, the opposite end of the link, which is yoke shape, being pivotally secured to the adjacent steering arm 2, at 14.

The steering wheel is shown at 15, the worm at 16, and the worm gear at 17, these elements being conventional structures. The worm and worm gear are disposed at a higher elevation than obtains in ordinary practice, thus shortening the steering wheel shaft 15a.

Integral with the worm gear 17 is a small spur gear 18, and meshing with the latter is a gear rack 19.

20 is the primary, or master cylinder, screw-threaded on to the ends of which are the cylinder heads 21 and 22, respectively. The head 22 has a stud 23 on which are two nuts 24 serving as means to secure the cylinder 20 to any portion of the vehicle where convenient attachment can be made.

Within the cylinder 20 is a piston 25, extending from which and passing through the head 21 and packing nut 26 is a piston rod 27, the outer end of the latter being screw-threaded into the gear rack 19 and held to any adjusted position therein by the lock nut 28.

The packing nut 26 has piston rod packing 29, the cylinder head 21 is provided with joint packing material 30, and the cylinder head 22 with packing material 31, all being for the purpose of preventing leakage of oil or other liquid medium from the system.

As is obvious, the steering operation in my apparatus starts with actuation of the hand steering wheel 15. Through the worm 16 and worm gear 17 a resistance against road shocks is procured, as well also as to provide increased leverage for steering.

Power from the worm gear is transmitted through the spur gear 18 and rack 19 to the piston 25 which is shown in midway position in cylinder 20.

Assume that a directional movement of the ground wheels (not shown) of the vehicle would require the piston to be moved toward the cylinder head 21. This action would force the oil or fluid medium through oil tube 32 into the left-hand end (as shown) of cylinder 5, forcing piston 7 to the right and turning the ground wheels to the left, for making a left-hand turn of the vehicle.

Now let it be supposed that, starting as before, with the piston midway the length of its stroke, it was moved toward cylinder head 22 of the cylinder 20. This would have the effect of forcing the liquid medium through tube 33 into the right-hand end of cylinder 5, causing piston 7 and interconnected elements to travel toward the left and swinging the ground wheels toward the right, for a right-hand turn of the vehicle.

It will be observed that in moving the piston 7 there are two forces acting on its faces, one positive pressure and the other a negative pressure or suctional force.

To procure extreme flexibility in the liquid-carrying lines hydraulic hose 34 with steel liners are placed thereon.

Should undue slackness in the steering gear occur, it indicates leakage of fluid from the steering system. But this difficulty is easily cured by the use of the oil reserve pump 35 which has connection with the two interior end portions of the master cylinder 20 through oil-conveying tubes 36 and 37, stop cocks 38 being provided to permit the oil or other fluid forced from the pump 35 to enter that end of the cylinder which requires replenishing with oil, in some cases both ends.

To insure that both cylinders and all fluid lines are completely filled when the oil reserve pump 35 is being used, bleeder or air-venting cocks 39 are mounted on the top side of cylinder 5.

As safety on the highways is becoming a matter of great concern with drivers of motor vehicles, I have elected to equip my steering system with co-operating facilities for automatically signalling to trailing traffic the intentions of a driver with respect to the direction he contemplates turning his vehicle off a straight course.

As modern vehicles are now usually equipped with two tail lamps, each operative to give a "stop" signal upon applying the brakes, I may utilize these in carrying out my caution light signalling idea. But in any event I will employ two lamps, placed on the rear end of the vehicle, the left-hand one, when lighted, indicating that a left-hand turn is to be made, and the right-hand one when it flashes showing that a right-hand turn of the vehicle is being started.

Fig. 7 shows, in sectional view, an oil-actuated switch, two of which I use in my signalling apparatus. It embodies a box-like structure 40 within which is a diaphragm 41 which, when flexed by the oil pressure from cylinder 5, makes contact with a terminal 42 and closes an electric circuit E. C., causing the lamp on that particular circuit to flash.

One of the caution lights will now flash, and the light will remain on until the pressure on both sides of the piston 7 is equal, or until the steering is begun in the opposite direction, at which time the other light will come on.

When the vehicle is going straight ahead and the piston is in midway position, or when making a very slight turn and the piston remains in a position slightly off the center point of its stroke, then there is an equalization of the pressures on both sides of the piston, and the light is off.

The pistons in the two cylinders of my apparatus are quite similar, and in certain respects out of the ordinary construction.

Near each end of the piston is cut a circumferential groove 44, normal to the axis of the piston. Starting at some point in this groove, on one end, is cut an endless spiral groove 45 extending over the face of the piston between the end grooves into which latter the spiral groove merges. Into these grooves is wound a wire 46, preferably made of spring steel, or piano wire, and this serves as the piston packing. The extreme ends of the wire are obliquely cut, as shown at 46a.

The master cylinder 20, and parts operatively connected therewith are shown in Figs. 1, 2 and 3 as vertically disposed. In some instances this positioning of the cylinder might interfere with other elements in the vehicle and cause more or less difficulty in installing it.

In Fig. 8 I have shown an alternative method of positioning this cylinder, 20, in which case it assumes a horizontal position, under the cowl of the vehicle and above the footboard thereof.

The ratio of steering effort, that is, the gain in leverage due to the employment of a worm and worm gear, is the same in my apparatus as is found in conventional practice. The swinging arc of the steering arms, however, may be increased or decreased by enlarging or reducing the diameters of the cylinders, or by a change in size of the spur gear which actuates the piston rod rack on the master cylinder.

The apparatus provides a very positive method of vehicle steering; can be readily adjusted to centralize the steering arms; provides for replenishing any loss in the fluid lines and cylinders, of the operating fluid, and overcomes difficulties arising from the swaying of the vehicle body which disaligns it from the front axle. Moreover, center steering, which has been largely stressed of late, is a predominating feature.

In addition to these advantages is the warning signal light, automatically co-operating with the steering function, which adds an important safety feature in the operation of motor vehicles over the highways.

What I claim is:

In a hydraulic steering-gear apparatus for motor vehicles the combination with a steering wheel, a worm and worm-gear steering set, a front axle, and two steering arms, of a cylinder mounted on said axle, a ground-wheel actuating piston in said cylinder, piston-rods extending out of the ends of said cylinder and having connections, respectively, with the two said steering arms, a second cylinder, a piston in said second cylinder, a piston-rod operating out of one end only of said second cylinder, a pinion integral with the worm gear of said steering set, a rack on the outer end portion of said second mentioned piston rod in axial alignment with said second cylinder, said rack adapted to engage said pinion and be moved longitudinally of said second cylinder in response to rotary movements of said worm, two flexible, fluid-carrying elements interconnecting, respectively, the ends of the two said cylinders, a fluid reserve supply pump, means associated with said pump, so constructed and arranged that fluid may be forced by said pump into either or both sides of the fluid pressure system, including the cylinders and interconnecting elements, for the purpose of completely filling said system and bringing said first mentioned piston, if disarranged, into central position in its cylinder, the operation being performed while said second piston is disposed in its longitudinally central position in the second cylinder, and airventing means on each end of said first cylinder.

GORDON W. HARDY.